No. 777,712. PATENTED DEC. 20, 1904.
T. B. ALDRICH & C. P. BECKWITH.
PROCESS OF MAKING HALOGEN TERTIARY BUTYL ALCOHOL.
APPLICATION FILED OCT. 17, 1902.
NO MODEL.
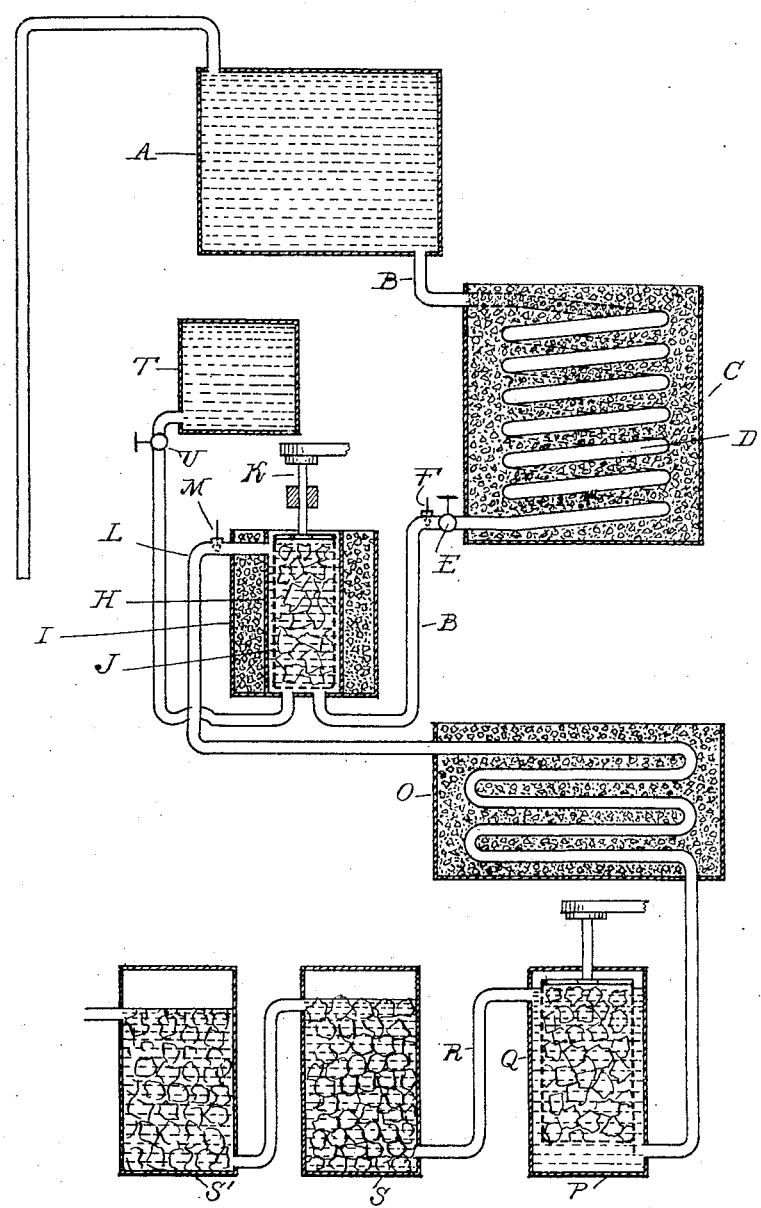

No. 777,712.

Patented December 20, 1904.

UNITED STATES PATENT OFFICE.

THOMAS B. ALDRICH AND CHARLES P. BECKWITH, OF DETROIT, MICHIGAN.

PROCESS OF MAKING HALOGEN-TERTIARY-BUTYL ALCOHOL.

SPECIFICATION forming part of Letters Patent No. 777,712, dated December 20, 1904.

Application filed October 17, 1902. Serial No. 127,637.

*To all whom it may concern:*

Be it known that we, THOMAS B. ALDRICH and CHARLES P. BECKWITH, citizens of the United States, residing at Detroit, in the county of Wayne and State of Michigan, have invented certain new and useful Improvements in Processes of Manufacturing Halogen-Tertiary-Butyl Alcohol, of which the following is a specification, reference being had therein to the accompanying drawing.

The invention relates to the manufacture of that class of halogen substitution products known as "halogen-tertiary-butyl alcohols."

It is the primary object of the invention to reduce the cost of manufacture by the prevention of the destruction of expensive materials in the formation of useless by-products.

It is a further object to simplify the process of refining by obtaining a comparatively pure crude product.

Heretofore halogen-tertiary-butyl alcohols have been prepared from a mixture of a ketone (such as acetone) and a halogen substitution product, (such as chloroform,) the union of the two ingredients being accomplished by introducing into the mixture a suitable condensing agent in powdered form—as, for example, caustic potash. The reaction which takes place results in the formation of a comparatively small quantity of the desired product, while a large proportion of the chloroform in the mixture is destroyed in the formation of by-products—such, *e. g.*, as potassium chlorid. As a consequence the yield of the desired products has always been relatively small.

In the improved process which forms the subject-matter of the present invention the old process has been modified in the following particulars, reference being made more particularly to the manufacture of the specific compound tri-chlor-tertiary-butyl alcohol:

First. In the old process a relatively small quantity of the condensing agent (about ten per cent. by weight) is introduced into the mixed chloroform and acetone and is allowed to remain therein for a considerable period of time. In the improved process the mixed ingredients are brought in contact with a relatively large amount of the condensing agent for a short period of time.

Second. In the old process the temperature of the mixture during reaction is from 15° to 40° above 0° centigrade. In the new process the mixture is first cooled to a relatively low temperature (*e. g.*, −10° to −14° centigrade) and the heat generated by the reaction is absorbed as rapidly as possible.

Third. In the old process the condensing agent is periodically introduced in powdered form into the whole quantity of mixture and remains therein during the entire treatment. In the new process the mixture is caused to flow by and in contact with a large surface of the condensing agent.

Fourth. In the old process the mixture after the end of the reaction and while containing a large amount of the condensing agent is placed in a still and the excess of chloroform and acetone driven off by heat. In the new process before heating the mixture in the still the condensing agent yet remaining in the mixture is neutralized or eliminated.

Fifth. In the old process the chloroform and acetone are mixed in the proportion of equal parts by weight. In the new process a considerable excess by weight of acetone is used in the original mixture, and after each treatment and the separation out of the product the remaining mixture is strengthened by the addition of chloroform to restore its original proportions.

As a result of the changes above enumerated the yield of the desired product is greatly increased and the amount of worthless by-products correspondingly decreased.

The improved result cannot be attributed solely to any one of the changes above referred to; nor is it solely due to the combination of all or a part of the changed steps. The effect of the changes are rather cumulative, each one contributing a part and together effecting the marked increase in yield.

The improved process may be carried out in various ways; but we will now describe a specific application which we have employed in the commercial manufacture of the specific compound tri-chlor-tertiary-butyl alcohol.

This compound is a white crystalline body, slightly soluble in water, very soluble in organic solvents—such as chloroform, alcohol, &c.—volatilizes readily in air and also with steam, has a melting-point of from 78° to 81° centigrade with water and approximately 96° centigrade without water, and is expressed by the formula:

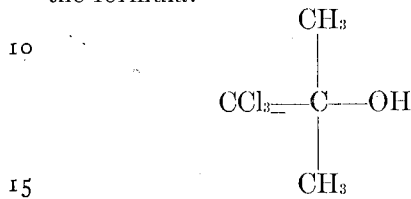

The specific form of apparatus employed will also be described, the same being illustrated diagrammatically in the drawing and being constructed as follows:

A is an elevated tank, from which leads a conduit B, passing through a cooling apparatus C. The latter is in the form of a tank or receptacle for receiving salt or ice or other cooling agent and containing a coil D, connected into the conduit B. At the outlet end of the coil D is arranged a valve E, by which the flow of the liquid through the coil is regulated. Adjacent to this valve is preferably placed a thermometer F for ascertaining the temperature of the liquid as it leaves the coil. Beyond the valve E the conduit B passes to a generator of the following construction: H is a cylindrical tank surrounded by a cooling-jacket I, preferably containing a mixture of salt and ice or other cooling agent. Within the tank H is a perforated receptacle or cage J, which is secured to a shaft K, the latter being provided with suitable connections for imparting a rotary motion thereto. Near the upper end of the tank H is an outlet-connection L, in which is placed a thermometer M for indicating the temperature of the mixture as it leaves the receptacle. The conduit L includes as a part thereof a coil arranged in a cooling-tank O, and after passing out from said tank said conduit is connected to the lower end of a receptacle P. This receptacle contains a revolving cage Q and is provided at its upper end with an outlet connection R, leading to a second receptacle S, while the latter is similarly connected to a third receptacle S'.

In the carrying out of the process the revolving cage J in the receptacle H is filled with a suitable condensing agent, such as lumps of fused potassium hydrate, while the cage Q in the receptacle P is filled with a neutralizing agent—such, e. g., as calcium chlorid. The succeeding receptacles S and S' are also filled with a neutralizing agent, and the apparatus may be provided with as many of these receptacles as found necessary to insure the complete neutralization of the condensing agent which remains in the mixture after passing from the generator. A suitable mixture of chloroform and acetone is then prepared and is placed in the tank. In the commercial manufacture a large amount of the mixture is required—such, e. g., as two thousand pounds of the acetone and fifteen hundred pounds of the chloroform. The mixed ingredients are forced by air-pressure or in any other suitable way into the tank A, from which the mixture flows through the conduit B and coil D in the cooling-tank C. Upon leaving the cooling-coil the temperature of the mixture is greatly reduced and is preferably from $-10°$ to $-14°$ centigrade.

The temperature may be regulated by adjusting the valve E so as to increase or diminish the time that the liquid remains in the cooling-tank. After passing the valve the conduit B enters the tank H at the bottom thereof, and the liquid flows upward in said tank, passing through into the cage J and in contact with the condensing agent therein. By reason of the revolution of this cage the mixture is kept in a constant state of agitation, which insures contact of all portions thereof with the condensing agent.

The heat due to the reaction causes a rise of temperature, and although this is partially absorbed by the cooling-jacket still upon leaving the receptacle H the thermometer M may indicate a temperature from $0° + 10°$ centigrade. Should the temperature rise above a safe limit, the attendant upon opening the valve E will increase the speed of flow through the receptacle, and consequently diminish the temperature. As a further precaution, a tank T, containing acetone, is arranged in proximity to the tank H and has an outlet connection leading into said tank and controlled by a valve U. Thus if the temperature cannot be kept down by the regulation of the valve E the valve U is opened, which will permit an extra amount of acetone to enter the receptacle H, which will dilute the mixture and wash away the chloroform, thereby diminishing the strength of the reaction and decreasing the heat. The acetone in this auxiliary tank may also be used for washing off the chloroform which adheres to the condensing agent in the cage whenever it is necessary to stop the flow of liquid through the apparatus or at the end of each run. After leaving the receptacle H the liquid containing the product formed during the reaction and also containing a certain amount of the condensing agent is passed through the cooling-tank O. This will again reduce the temperature, so as to stop further reaction and prevent danger of any portion of the newly-formed product being destroyed by the action of the condensing agent. After leaving the tank O the mixture passes into the tank P, where it is brought into intimate contact with the neutralizing agent in the revolving cage Q, the effect being to neutralize and to precipitate out the greater portion of the caustic alkali, so as to stop further action upon the materials.

The auxiliary tanks S S' serve to eliminate any of the condensing agent which has passed unneutralized through the tank P. After leaving the tank S' the liquid may be allowed to remain for a sufficient time to permit the precipitate to settle, after which it is transferred to a still. (Not shown.) Here the excess of chloroform and acetone is driven off, leaving an oily liquid, which consists largely of the desired product. This liquid is drawn off from the still into a receptacle containing fine ice, which immediately precipitates the crude product. The water is then pressed out, leaving the product in condition for refining. The mixture of acetone and chloroform driven off in the still is then tested for specific gravity and a sufficient quantity of chloroform is added to restore the mixture to substantially the same proportions as in the first run, after which it is passed through the apparatus a second time, and the operations are repeated until the mixture is exhausted.

While we have thus specifically described the improved process as it has been actually used in the manufacture of tri-chlor-tertiary-butyl alcohol, it is obvious that many of the details might be slightly modified without departing from the spirit of the invention. It is also evident that the process is applicable to the manufacture of other halogen-tertiary-butyl alcohols—e. g., brom-tertiary-butyl alcohol.

In forming other compounds certain changes in the temperature and time of treatment may be necessary; but the broader features of the improvements are applicable to all.

The exact nature of all the chemical changes resulting from the process as described cannot be specifically set forth; but the following facts are apparent: Improved results are obtained, first, when the condensing agent is "eliminated" or "neutralized" (meaning by this term that it is changed so as to no longer act destructively upon the material or product) before separation of the product; second, when such treatment is limited to a short period of time; third, when the temperature during treatment is low; fourth, when there is an excess of the ketone present in the mixture; fifth, when the amount of surface of condensing agent used during the treatment is relatively large, the time being short and the temperature low.

The passing of the mixture in flowing contact with the surface of the condensing agent instead of mixing in the latter in powdered form is always a marked improvement both for the reason that the reaction is under complete control, so that it may be checked at any time, and for the further reason that considerably less quantity of the condensing agent is needed for the whole process. As has been above stated, the quantity of condensing agent relative to the quantity of mixture at any one time under treatment is relatively large.

In order to more accurately define what is meant by the terms "relatively large" and "relatively short," the following comparison in figures is made between the old process and the specific process which has been employed by us:

| | Old process. | New process. |
|---|---|---|
| Proportion of acetone to chloroform. | 4 to 4. | 4 to 3. |
| Percentage of condensing agent relative to weight of mixture under treatment at one time. | From 10 to 30. | About 70. |
| Percentage of condensing agent in relation to whole quantity chloroform and acetone. | From 10 to 30. | 10. |
| Time of reaction in each treatment. | Several days. | From 1 to 10 minutes. |
| Percentage of yield of product based on weight of chloroform and acetone used. | From 10 to 20. | Over 50. |

These figures are not given to limit our new process, for it is evident improved results might be obtained over the old process even were a considerable change of the figures given. It is also true that for different specific compounds the proportions must be varied. We therefore mean by the terms "relatively large," "short," "low," respectively, larger, shorter, and lower than has heretofore been used in the processes known to the art.

What we claim as our invention is—

1. The process of forming halogen-tertiary-butyl alcohol which consists in subjecting a mixture of a ketone and a halogen substitution product to momentary contact with the condensing agent.

2. The process of forming halogen-tertiary-butyl alcohol which consists in passing a mixture of a ketone and a halogen substitution product in flowing contact with the condensing agent.

3. The process of forming halogen-tertiary-butyl alcohol which consists in flowing a mixture of a ketone and a halogen substitution product through a broken mass of a condensing agent.

4. The process of forming halogen-tertiary-butyl alcohol which consists in flowing a mixture of a ketone and a halogen substitution product through a broken mass of condensing agent in a state of agitation.

5. The process of forming halogen-tertiary-butyl alcohol which consists in flowing a mixture of a ketone and halogen substitution product upward through a rotating broken mass of the condensing agent.

6. The process of forming halogen-tertiary-butyl alcohol which consists in subjecting a mixture of a ketone and a halogen substitution product to contact with a relatively large surface of condensing agent.

7. The process of forming halogen-tertiarybutyl alcohol which consists in subjecting a mixture of a ketone and a halogen substitution product to momentary contact with a relatively large surface of a condensing agent, and in absorbing the heat generated by the reaction of artificial cooling.

8. The process of forming halogen-tertiary-butyl alcohol which consists in successively treating a mixture of the ketone and halogen substitution product with a condensing agent at low temperature whereby the amount of product formed by each treatment is limited, and the amount of by-product is limited to a greater degree.

9. The process of forming halogen-tertiary-butyl alcohol which consists in subjecting a mixture of the ketone and a halogen substitution product cooled to a temperature of zero C. to contact with a relatively large surface of condensing agent, and in absorbing the heat generated by the reaction by further cooling.

10. The process of forming halogen-tertiary-butyl alcohol which consists in treating a mixture of a ketone, and a halogen substitution product with a condensing agent in neutralizing the condensing agent remaining in the mixture after treatment and subsequently separating out the product.

11. The process of forming halogen-tertiary-butyl alcohol which consists in successively treating a mixture of a ketone and a halogen substitution product by subjecting it to momentary contact with a condensing agent in neutralizing, the condensing agent remaining in the mixture after each treatment in separating out the product subsequent to neutralization.

12. The process of forming halogen-tertiary-butyl alcohol which consists in treating with a condensing agent a mixture of a ketone and halogen substitution product, the amount of the former being considerably in excess by weight of that of the latter.

13. The process of forming halogen-tertiary-butyl alcohol, which consists in subjecting to successive treatments with a condensing agent a mixture of a ketone and a halogen substitution product, the former being in excess by weight of the latter, in separating out the product between treatments by distilling off the excess of uncombined materials, and in strengthening up the mixture with an additional amount of halogen substitution product to obtain the original proportions for the succeeding treatment.

14. The process of forming halogen-tertiary-butyl alcohol which consists in flowing a mixture of a ketone and halogen substitution product through a condensing agent, and in checking the reaction when too energetic by dilution with additional ketone.

15. The process for forming halogen-tertiary-butyl alcohol, which consists in first preparing a mixture of a ketone and a halogen substitution product, the amount of the former being in excess of the latter, in cooling the mixture to zero C., flowing it through a broken mass of condensing agent, having a relatively large surface in absorbing the heat generated by the reaction by further cooling in neutralizing the condensing agent remaining in solution after treatment, in separating out the product subsequent to neutralization, by distilling off the excess of uncombined materials in strengthening up the distillate with additional halogen substitution product, to obtain the original proportions for the successive treatment and in checking the reaction when too energetic, by dilution with additional ketone.

In testimony whereof we affix our signatures in presence of two witnesses.

THOMAS B. ALDRICH.
CHARLES P. BECKWITH.

Witnesses:
M. B. O'Dogherty,
A. G. Robertson.